United States Patent Office 3,743,677
Patented July 3, 1973

3,743,677
CONTINUOUS MANUFACTURE OF BIS(AMINO-CYCLOHEXYL)-ALKANES OR BIS(AMINOCY-CLOHEXYL)ETHERS
Otto-Alfred Grosskinsky and Karl Merkel, Ludwigshafen, Germany, assignors to Badische Anilin- & Soda-Fabrik Aktiengesellschaft, Ludwigshafen am Rhine, Germany
No Drawing. Filed Aug. 3, 1971, Ser. No. 168,732
Int. Cl. C07c 85/14
U.S. Cl. 260—563 D          4 Claims

ABSTRACT OF THE DISCLOSURE

Continuous process for the hydogenation of bis(aminophenyl) alkanes to bis(aminocyclohexyl) alkanes using suspended hydrogenation catalysts, in which the heat of reaction is substantially removed from the reaction vessel by means of a recycled liquid.

---

This invention relates to a continuous process for the production of bis(aminocyclohexyl) alkanes or bis(aminocyclohexyl) ethers by hydrogenation of the corresponding bis(aminophenyl) alkanes or ethers at temperatures of from 120° to 240° C. and pressures of from 100 to 450 atmospheres and in the presence of suspended hydrogenation catalysts and solvents which are inert under the reaction conditions.

U.S. Pat. 2,606,927 discloses that aminodiphenyl alkanes can be hydrogenated in the presence of ethers such as dioxane and cobalt or nickel catalysts. The yields obtained by this process, however, are unsatisfactory. In another process described in German Pat. 888,767 good yields are obtained in a small plant in the hydrogenation of bis(4-aminophenyl)-methane using ruthenium catalysts in the presence of dioxane, but the yields fall rapidly when the process is carried out on a commercial scale, this being due to inadequate temperature control, German Pat. 842,200 discloses that the hydrogenation of bis(4-aminophenyl)-methane in the presence of cobalt or nickel catalysts which have been activated with alkaline earth metal oxides gives high yields. However, this process is not suitable for continuous operation since the catalytic composition agglomerates after only a short on-stream period and thus becomes ineffective. All of the prior art processes suffer from the common drawback that local overheating readily occurs at the catalyst with the result that by-products are very readily formed. Such exothermic side reactions cause the temperature in the reaction zone to rise to more than 800° C. within a few minutes with the result that the catalyst used is rendered useless.

It is an object of the invention to provide a method of hydrogenating bis(aminophenyl) alkanes or bis(aminophenyl) ethers continuously without any local overheating occurring.

This and other objects are achieved in an advantageous improved process for the production of bis(aminocyclohexyl) alkanes or bis (aminocyclohexyl) ethers by the hydrogenation of the corresponding bis(aminophenyl) alkanes or ethers at temperatures of from 120° to 240° C. and pressures of from 100 to 450 atmospheres in the presence of suspended hydrogenation catalysts and solvents which are inert under the reaction conditions wherein the improvement comprises recycling an amount of the liquid reaction mixture equivalent to from 2 to 20 times the amount of fresh starting materials and solvent fed to the system.

One of the advantages of our novel process is that it proceeds continuously with good yields and without local overheating and the associated de-activation of the catalyst.

The bis(aminophenyl) alkanes or bis(aminophenyl) ethers have the general formula:

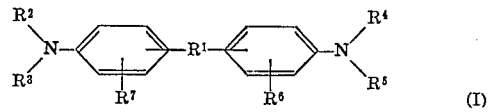

(I)

where $R^1$ denotes alkylene or alkylidene having from 1 to 4 carbon atoms, such as methylene, ethylene, ethylidene, propylene and propylidene, or oxygen, $R^2$, $R^3$, $R^4$ and $R^5$ each denote hydrogen or alkyl having from 1 to 4 carbon atoms and $R^6$ and $R^7$ each denote hydrogen or alkyl or alkoxy having from 1 to 4 carbon atoms. Of particular importnace are starting materials of Formula I where $R^1$ denotes alkylene or alkylidene having from 1 to 3 carbon atoms, $R^2$, $R^3$, $R^4$ and $R^5$ each denote hydrogen and $R^6$ and $R^7$ each denote hydrogen or methyl. Suitable starting materials are, for example, bis(4-aminophenyl) methane,
bis(4-amino-2-methylphenyl) methane,
bis(4-N-dibutylaminophenyl) methane,
bis(4-aminophenyl) propane-1,3-,
bis(4-aminophenyl) butane-1,4,-
bis(4-aminophenyl) propane-2,2,
bis(4-amino-5-methoxyphenyl) methane,
bis(4-N-dimethylaminophenyl) ether,
bis(3-aminophenyl) methane,
4-amino-3'-aminodiphenylmethane.

The reaction is carried out at temperatures of from 120° to 240° C. Particularly suitable temperatures are from 180° to 235° C. It has been found particularly advantageous to maintain a temperature difference between the inlet and outlet of the hydrogenation zone of not more than 15° C., preferably not more than 10° C. The reaction is carried out at pressures of from 100 to 450 atmospheres, pressures of from 200 to 300 atmospheres being particularly preferred.

The reaction is carried out in the presence of solvents which are inert under the conditions of the reaction. Suitable solvents are the bis(aminocyclohexyl) alkane or ether products themselves and ethers, such as 1,4-dioxane, hexamethylene oxide, pentamethylene oxide and tetrahydrofuran, as well as amines such as cyclohexylamine; tetrahydrofuran is particularly preferred. The solvent is advantageously used in amounts of from 20 to 90%, particularly from 30 to 70%, by weight based on the combined weights of solvent and compound to be hydrogenated.

It has also been found advantageous co-use ammonia or lower alkylamines, such as methylamine or ethylamine, in amounts of up to 20% by weight based on the starting materials to be hydrogenated.

Preferred catalysts are the conventional, readily available hydrogenation catalysts such as copper, chromium, manganese, cobalt, nickel and ruthenium. Cobalt and ruthenium catalysts have been found to be particularly advantageous. If cobalt catalysts are used, they may contain up to 10% by weight of manganese, copper or chromium, based on the cobalt. The catalysts are used in a finely divided form so that they can be suspended in the system. The catalysts used may be unsupported or supported on carriers such as pumice, aluminum oxide and silicates. Preferably, supported cobalt catalysts contain from 5 to 40% by weight of cobalt and supported ruthenium catalysts contain from 0.1 to 2% by weight of ruthenium. Before use, the catalysts are advantageously sintered at temperatures of from 400 to 500° C. followed by reduction with hydrogen at temperatures of from 200° to 350° C. In the case of cobalt catalysts, it is advantageous for the catalyst system to contain alkali or alkaline earth metal hydroxides, oxides or carbonates, such as sodium carbonate, sodium hydroxide, potassium hydroxide, calcium hydroxide and magnesium oxide. The amount of the said alkali or alkaline earth metal compounds is advantageously from 0.1 to 2% of the weight of the cobalt metal used.

It is an essential feature of the invention that an amount of the liquid reaction medium equivalent to from 2 to 20 times the amount of freshly introduced solvent and compound to be hydrogenated be recycled. Particularly good results are obtained when the amount of reaction medium recycled is from 3 to 10 times that of the freshly introduced material. It is obvious that the catalyst suspended in the reaction mixture is advantageously separated from the whole reaction discharge if the latter is to pass through a second hydrogenation stage.

The process of the invention is carried out, for example, by placing a suspension of one of said catalysts in a mixture of one of said bis(aminophenyl) alkanes or bis(aminophenyl) ethers and one of said solvents in the specified proportions in a high-pressure tube and recycling the suspension via an outer loop, introducing hydrogen under pressure and effecting hydrogenation under the specified temperature and pressure conditions. A mixture of the bis(4-aminophenyl) alkane or ether used and solvent is continuously fed to the loop at the same rate as the reaction mixture is withdrawn. The catalyst is removed from the discharged reaction mixture, for example by decantation, and then returned to the loop.

In a particularly advantageous continuous method, hydrogenation is carried out in the manner described above until the conversion is from 80 to 90%, whereupon the reaction mixture, after removal of the catalyst which is returned to the loop, is passed to a second high-pressure tube containing a fixed bed of catalyst of the specified composition where hydrogenation is completed under the specified temperature and pressure conditions. The escaping hydrogen is advantageously recycled to the first stage together with fresh hydrogen. Only a small amount of inert portions is removed. The specified portion of the discharged reaction mixture is recycled to the first hydrogenation stage. The non-recycled portion of the reaction mixture is worked up by conventional methods, for example fractional distillation, to give the pure end product. The solvents thus separated are advantageously reused.

The bis(4-aminocyclohexyl) alkanes or bis(4-aminocyclohexyl) ethers produced by the process of the invention are valuable raw materials for the preparation of polyamides.

The invention is illustrated by the following example.

EXAMPLE

To the top of a high-pressure tube having a length of 12 m., a diameter of 40 cm. and a capacity of 1.5 m.³ there are fed, per hour, 300 kg. of tetrahydrofuran, 300 kg. of a diaminodiphenylmethane/isomer mixture containing 95% by weight of bis(4-aminophenyl) methane and 2,700 kg. of recycled reaction mixture consisting of 48.5% by weight of tetrahydrofuran, 48.5% by weight of a diaminodicyclohexylmethane/isomer mixture corresponding to the starting compound and 1.5% by weight of low-boiling portions and 1.5% by weight of non-distillable portions. In the reaction solution there are suspended 300 kg. of a catalyst containing 25% by weight of cobalt and 2% of manganese supported on pumice. Hydrogen is continuously introduced at the bottom of the tube such that a pressure of 250 atmospheres is maintained at a temperature of from 210° to 215° C. The discharged reaction mixture is separated from suspended catalyst in a decanter. The catalyst residues are retained by a filter and the reaction mixture is then passed to the bottom of a second high-pressure tube having a capacity of 1,500 liters. The second high-pressure tube is provided with a fixed bed of catalyst containing 25% by weight of cobalt and supported on pumice. In the second high-pressure tube a temperature of 215° to 230° C. and a pressure of 250 atmospheres are maintained. At the top of the second high-pressure tube there are obtained, per hour, 3,320 kg. of reaction mixture, of which 2,700 kg. is recycled to the first high-pressure tube. The remaining 620 kg./hr. are fractionally distilled in a three-stage distillation plant. There are thus obtained 300 kg./hr. of tetrahydrofuran and 300 kg./hr. of bis(4-aminocyclohexyl) methane having a boiling point of 180° C. at 10 mm. and a softening point of 40° C. The yield of pure distilled bis(4-aminocyclohexyl) methane is 94% based on the bis(4-aminophenyl) methane introduced.

The results of this hydrogenation process had not changed after an on-stream period of 30 days.

We claim:

1. In a process for the continuous manufacture of a diaminodicyclohexyl alkane or diaminodicyclohexyl ether having the formula

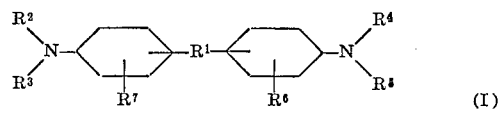

(I)

wherein $R^1$ denotes alkylene or alkylidene of from 1 to 4 carbon atoms or oxygen, $R^2$, $R^3$, $R^4$ and $R^5$ each denote hydrogen or alkyl of from 1 to 4 carbon atoms and $R^6$ and $R^7$ each denote hydrogen or alkyl or alkoxy of from 1 to 4 carbon atoms, by hydrogenation of the corresponding diaminodiphenyl alkane or ether at temperatures of from 120° C. to 240° C. and pressures of from 100 to 450 atmospheres in the presence of a suspended hydrogenation catalyst and at least one solvent which is inert under the reaction conditions, the improvement which comprises carrying out the hydrogenation in a first hydrogenation zone under the foregoing conditions to a conversion of from 80 to 90%, separating the suspended hydrogenation catalyst from the reaction product of said first zone, completing hydrogenation in a second hydrogenation zone in the presence of a fixed-bed hydrogenation catalyst at temperatures of from 120° C. to 240° C. and pressures of from 100 to 450 atmospheres and recycling a portion of the liquid reaction medium from this second zone into the first hydrogenation zone in an amount which is equivalent to from 2 to 20 times the amount of freshly introduced solvent and compound to be hydrogenated.

2. A process as claimed in claim 1 wherein the hydrogenation in at least said first zone is carried out in the presence of ammonia or a lower alkylamine in an amount of up to 20% by weight based upon the compound to be hydrogenated.

3. A process as claimed in claim 1 wherein the hydrogenation catalyst is selected from the group consisting of copper, chromium, manganese, cobalt, nickel and ruthenium.

4. A process as claimed in claim 1 wherein the suspended hydrogenation catalyst separated from the reaction product of said first zone is continuously returned to said first hydrogenation zone.

References Cited

UNITED STATES PATENTS 3,591,635   7/1971   Farrissey, Jr. et al. -- 260—563 D

FOREIGN PATENTS 1,170,619   11/1969   Great Britain _____ 260—563 D

LEWIS GOTTS, Primary Examiner

D. R. PHILLIPS, Assistant Examiner

U.S. Cl. X.R.

260—563 B

PO-1050
(5/69)

UNITED STATES PATENT OFFICE
CERTIFICATE OF CORRECTION

Patent No. 3,743,677          Dated July 3, 1973

Inventor(s) Otto-Alfred Grosskinsky and Karl Merkel

It is certified that error appears in the above-identified patent and that said Letters Patent are hereby corrected as shown below:

Column 1, line 9, insert -- Claims priority, application Germany, August 11, 1970, P 20 39 818.9 --.

Column 1, line 37, "control, German" should read -- control. German --.

Column 2, line 22, "propane-1,3-" should read -- propane-1,3 --; line 23, "butane-1,4-" should read -- butane-1,4 --.

Signed and sealed this 27th day of November 1973.

(SEAL)
Attest:

EDWARD M. FLETCHER, JR.
Attesting Officer

RENE D. TEGTMEYER
Acting Commissioner of Patents